United States Patent
Sandberg (10) Patent No.: US 10,221,907 B2
(45) Date of Patent: Mar. 5, 2019

(54) DISC BRAKE AND BRAKE ACTUATION MECHANISM FOR A DISC BRAKE

(71) Applicant: Haldex Brake Products AB, Landskrona (SE)

(72) Inventor: Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 71 days.

(21) Appl. No.: 15/127,246

(22) PCT Filed: Mar. 18, 2015

(86) PCT No.: PCT/EP2015/055714
§ 371 (c)(1),
(2) Date: Sep. 19, 2016

(87) PCT Pub. No.: WO2015/140225
PCT Pub. Date: Sep. 24, 2015

(65) Prior Publication Data
US 2017/0108068 A1    Apr. 20, 2017

(30) Foreign Application Priority Data

Mar. 19, 2014    (DE) .................... 20 2014 002 459 U (51) Int. Cl.
*F16D 65/56* (2006.01)
*F16D 65/18* (2006.01)
(Continued)

(52) U.S. Cl.
CPC ......... *F16D 65/567* (2013.01); *F16D 55/226* (2013.01); *F16D 55/227* (2013.01); *F16D 65/0043* (2013.01); *F16D 65/18* (2013.01); *F16D 65/52* (2013.01); *F16D 66/026* (2013.01); *F16D 2121/14* (2013.01); *F16D 2125/28* (2013.01); *F16D 2125/40* (2013.01); *F16D 2129/04* (2013.01); *F16D 2250/0084* (2013.01)

(58) Field of Classification Search
CPC ....... F16D 65/567; F16D 65/18; F16D 55/226
See application file for complete search history.

(56) References Cited

U.S. PATENT DOCUMENTS

2005/0284709 A1* 12/2005 Sandberg ............ F16D 65/0043
188/72.1
2013/0008749 A1* 1/2013 Sandberg .............. F16D 55/227
188/71.8

FOREIGN PATENT DOCUMENTS

| DE | 102006020550 A1 | 1/2008 |
|----|----|----|
| WO | 2004059187 A1 | 7/2004 |
| WO | 2011113554 A2 | 9/2011 |

* cited by examiner

*Primary Examiner* — Vishal R Sahni
(74) *Attorney, Agent, or Firm* — St. Onge Steward Johnston and Reens LLC (57) ABSTRACT

A disc brake including a brake caliper and a brake actuation mechanism having an amplification mechanism for introducing a clamping force, an adjustment mechanism for compensating a lining wear having a torque clutch, a thrust element for transmitting the clamping force onto the brake disc, wherein the thrust element includes an adjustment spindle, and a return mechanism, wherein the amplification mechanism, the adjustment mechanism, the thrust element and the return mechanism are mounted in a functional interacting manner in the brake caliper by way of a rod. The disc brake is further provided with at least one device, which is configured to exert a defined resistant torque on the rotation of the adjustment spindle.

23 Claims, 6 Drawing Sheets

(51) Int. Cl.
  *F16D 65/52*    (2006.01)
  *F16D 55/226*   (2006.01)
  *F16D 55/227*   (2006.01)
  *F16D 65/00*    (2006.01)
  *F16D 66/02*    (2006.01)
  *F16D 129/04*       (2012.01)
  *F16D 121/14*       (2012.01)
  *F16D 125/28*       (2012.01)
  *F16D 125/40*       (2012.01)

DISC BRAKE AND BRAKE ACTUATION MECHANISM FOR A DISC BRAKE

FIELD OF THE INVENTION

The present invention relates to a disc brake, in particular for an utility vehicle, and to a brake actuation mechanism for a disc brake.

BACKGROUND OF THE INVENTION

In this connection the invention shall include disc brakes which either comprise a sliding caliper or a fixed caliper, and which overlap one or more brake discs. Mainly but not exclusively the invention relates to disc brakes with lining sections of the spot-type.

Disc brakes, in particular for heavy load trucks, with different configurations are known both with respect to the type of the brake actuation mechanism, with respect to the way of the transmission of the braking force onto one or several brake discs and with respect to the type of the adjustment for compensating the wear of the brake pads and brake linings, respectively.

For example, one specific embodiment of a brake actuation mechanism, which is embodied in disc brakes, is known from International Application WO 2011/113554 A2 of the applicant. The brake actuation mechanism as known from this application is characterized by a very compact structure, which is associated with reduced space requirements in the housing of the brake caliper and with a smaller weight. It is easy to mount and its single components can be made in an easy and cheap manner due to their, by the majority, rotational symmetric configuration.

The brake actuation mechanism for a disc brake as known from this publication having a brake caliper, preferably a sliding caliper, comprises an amplification mechanism for introducing a clamping force, an adjustment mechanism for compensating a wear of the brake pads, which includes a torque clutch, a thrust element for transmitting the clamping force onto the brake disc and a return mechanism, wherein the amplification mechanism, the adjustment mechanism, the thrust element and the return mechanism are mounted in the brake caliper in a functional interacting manner by means of a rod, which is supported in axial direction in the housing of the brake caliper, in such a way that these components act in parallel to the rotational axis of the brake disc.

For that purpose, the configuration and dimensioning of the rod is selected so that the single brake components either in different module units or the brake actuation mechanism in its entirety, each as self-supporting units, will be supported on the rod on the one hand and thereby in the housing of the brake caliper on the other and will be held in the rear section of the housing of the brake caliper which section faces away from the brake disc.

The thrust element for transmitting the clamping force onto the brake disc comprises an adjustment spindle which in turn is in threaded engagement with a thrust piece cooperating with a brake pad, wherein the thrust piece is axially guided in the housing of the brake caliper in a non-rotatable manner, so that a rotation of the adjustment spindle will result in an axial displacement of the thrust piece. The adjustment mechanism for compensating a clearance (or slack) comprises a torque clutch, which is controlled by torques and which serves for the selective transmission of a rotation between the elements of the torque clutch depending on the rotational direction.

Furthermore, the adjustment mechanism comprises a sprag (or wrap) spring serving as an one-way clutch, which connects two elements, an internal holding (or receiving) sleeve and a hollow shaft, being rotatably supported on the rod, wherein the sprag spring is enclosed coaxially on the rod by these both elements. For that purpose, the one-way clutch configured in such a way is designed, so that it transmits a rotational motion between these both elements during brake actuation, while it slips upon brake release, so that then no rotational movement will be transmitted between these elements. In that way, it is ensured that upon brake release no rotational movement of the elements occurs in the opposite rotational direction, which basically is undesired. Such a rotational movement would lead to a rearward travel motion of the adjustment mechanism, i.e. being directed away from the brake disc, which travel motion would result in an axial displacement of the thrust piece being directed away from the brake disc and would thus again increase the clearance to some extent, which clearance previously has been compensated during brake actuation upon advancement of the thrust piece by means of the adjustment mechanism.

With respect to the exact functioning as regards clamping and transmitting of the brake force as well as regards adjustment of the clearance of the brake actuation mechanism as known from the prior art, it should herewith expressively be referred to the disclosure of WO 2011/113554 A2.

Under certain circumstances a certain, however small risk exists with respect to the above-mentioned brake actuation mechanism, in that the adjustment mechanism and the thrust piece, respectively, could nevertheless move away from the brake disc, if no more brake force will be transmitted.

It can thus not always be guaranteed, that the sprag spring will always slip and decouple the internal holding sleeve from the hollow shaft upon release of the brake. It is possible that still a certain, but nominal small torque can appear in the slipping direction of the one-way clutch, which could effect a rotation of the elements in a direction opposite to the direction of the rotational transmission between the elements upon brake actuation, though by a few degrees only.

Under certain circumstances a further problem could exist in that single frictional contacts between the single components of the brake actuation mechanism as such and the resulting sum of all these frictional contacts, respectively, will be sufficient in order to cause a torque upon release of the brake, i.e. in case no more clamping force is transmitted through the brake actuation mechanism and through its single components and thus also through the adjustment mechanism, which torque will be large enough to apply a rotation onto components, which components shall not rotate upon release of the brake, wherein under certain circumstances this rotation as transmitted onto such components could effect a counter-rotation of the adjustment mechanism and thus a return motion of the thrust piece.

If for some reasons the frictional resistance, which exists in the threaded contact between the adjustment spindle and the thrust piece, is smaller than expected, the afore-mentioned risk of an unwanted return motion of the entire adjustment mechanism will increase, since normally this frictional resistance, possibly together with other frictional forces existing inside the entire brake actuation mechanism, is aimed to create some resistance against rotations in the latter or at least in single components of it, which resistance is sufficient so that the one-way clutch always enables slipping unresistingly.

Basically, it would be possible to reduce or entirely exclude the afore-mentioned risk, if the friction resistance will be increased directly in the threaded contact and threaded engagement, respectively, between the adjustment spindle and the thrust piece. This, however, could be only realized up to a certain extent, since at the same time thereby an unnecessary resistance will be applied to the rotational movement for compensating the clearance during brake actuation.

Moreover, it would be very difficult to determine and to control the desired frictional resistance of and inside an entire arrangement, which comprises several components, which are functionally interacting together by different means, such as for example the afore-mentioned brake actuation mechanism having an integrated adjustment mechanism according to the prior art, with sufficient accuracy, since amongst other things also manufacturing tolerances and other deviations resulting from manufacturing could take influence.

Thus, in total it can happen that a clearance, which has been previously adjusted by means of the adjustment mechanism, cannot be maintained during the subsequent release of the brake, which speaks against a sufficient functional safety and reliability of the adjustment mechanism.

From this disadvantage the aim results to almost reduce, or to even entirely exclude the afore-mentioned risk of an unwanted return motion in a brake actuation mechanism for a disc brake.

In this connection, the invention is preferably directed to a brake actuation mechanism, which as such is disclosed in WO 2011/113554 A2, to which disclosure it is herewith expressively referred; however, the invention is not limited to such a brake actuation mechanism. Rather, the invention can be also employed with brake actuation mechanisms, for which generally a risk of an unwanted reset motion exists by means of the adjustment mechanism during brake release, independent from its actual functional and constructional design.

SUMMARY OF THE INVENTION

The afore-mentioned object is solved by a disc brake as well as by a brake actuation mechanism according to the claims.

A disc brake is suggested which comprises a brake caliper, which at least overlaps one brake disc, and a brake actuation mechanism, which consists of an amplification mechanism for introducing a clamping force, an adjustment mechanism for compensating the wear of brake pad linings, which comprises a torque clutch, a thrust element for transmitting the clamping force onto the brake disc, wherein the thrust element comprises an adjustment spindle which is in threaded engagement with a thrust piece, which cooperates with a brake pad, and wherein the thrust piece is guided in the housing of the brake caliper in a rotationally fixed manner, i.e. non-rotatably but axially displaceably, so that a rotation of the adjustment spindle results in an axial displacement of the thrust piece, and of a return mechanism, wherein the amplification mechanism, the adjustment mechanism, the thrust element and the return mechanism are mounted in the brake caliper in a functionally interacting manner by means of a rod being fixedly and non-rotatably supported in the housing of the brake caliper in axial direction.

According to the invention the disc brake and the brake actuation mechanism, respectively, are additionally provided with at least one device, which is configured to exert a defined resistant torque (or torque resistance) on, i.e. against, the rotation or on the rotatable support of the adjustment spindle.

For that purpose the device according to the invention is configured so that the resistant torque, the magnitude of which is selected in a defined way, shall act in relation to the rotation of the adjustment spindle either permanently, i.e. both during brake actuation and during release of the brake, or at least during release of the brake only.

In other words, the rotational ability of the adjustment spindle will be purposefully influenced, limited and prevented, respectively, upon brake release.

According to a preferred embodiment this device, which could consist of one single element or from a combination of several functionally interacting elements, is configured and arranged in such a way that it is able to actually increase the friction in the threaded engagement, i.e. in the rotational connection between the adjustment spindle and the thrust piece, to a predefined extent.

For example, this can be realized in that the device does or elements of it do directly act onto the internal thread of the thrust piece and/or onto the external thread of the adjustment spindle. Alternatively, this device can be also configured so that it acts onto a piece or component of the brake actuation mechanism, which is rotationally fixedly connected with the adjustment spindle, i.e. which rotates together with the adjustment spindle.

Ideally, the adjustment spindle is configured as a hollow spindle so that the device for creating the defined resistant torque can be arranged inside the hollow spindle, which enhances a compact structure.

In particular the device is preferably set under a defined pretension, which, for example, could be created by the positioning of the device within the brake actuation mechanism or also by means of additional spring elements.

According to the invention the device for creating the defined resistant torque comprises an abutment cup, against which a coil spring of the return mechanism is supported.

According to a first embodiment this abutment cup is rotatably supported at the end of the rod facing the brake disc on the one hand and is non-rotatably fixedly connected with the adjustment spindle by means of at least one connecting element on the other, wherein the at least one connecting element, however, allows for an ability with respect to a relative axial displacement between the adjustment spindle and the abutment cup.

A fixation nut is screwed onto the end of the rod facing the brake disc, which end comprises a corresponding thread, in such a way that the abutment cup is axially positioned on the rod, however, could still be rotated relative to the rod and to the fixation nut.

For the purpose of the connecting element, which is able to hold the abutment cup in a non-rotatable fixed connection with the adjustment spindle, in principle, any kind of means can be used, which also enables an axial relative movability between these components, such as, for example, a splined/keyway connection, sliding block guidance or similar.

In one embodiment according to the invention, therefore the abutment cup comprises a pin, spigot or similar which engages with a corresponding axial longitudinal groove inside the hollow adjustment spindle in a slidable manner.

Since the coil spring of the return mechanism attaches to the abutment cup at the brake disc side, by means of a corresponding pretension of the coil spring, which at the same time also can serve for creating a defined torque limitation for the torque clutch, the resistant torque against unwanted rotations of the adjustment spindle upon release of the brake can be realized as follows.

The rod, which mounts all components of the brake actuation mechanism in the housing of the brake caliper in a functionally interacting manner, not only serves as a fixation means for the entire brake actuation mechanism, but thus also serves as a reference for the setting and adjustment of the resistant torque, i.e. as an abutment for that purpose too.

The rod traverses an opening in the rear section of the housing of the brake caliper and is fixed at its end facing away from the brake disc, at which end it comprises a corresponding thread, by means of a further fixation nut. Opposite to this fixation nut the abutment cup is fixed on the rod by means of the fixation nut.

By setting the axial position of the abutment cup, since the latter directly or indirectly is in contact with the coil spring of the return mechanism, on the one hand and by fixing the rod in the housing of the brake caliper on the other the coil spring will be mounted so that the latter can exert the axial spring force as desired. This axial spring force will previously be determined via a corresponding dimensioning of the coil spring and definition of its spring characteristic curve, respectively. This axial spring force then determines the desired resistant torque of the device according to the invention.

It is also possible that this axial spring force of the coil spring can be set individually, in that, for example, the axial position of the coil spring on the rod can be variably set to a certain degree during the assembly of the brake actuation mechanism in the housing of the brake caliper, which, if applicable, even enables a later adjustment of the axial spring force on demand for an assembled brake actuation mechanism.

According to the invention the rod has to be mounted in the housing of the brake caliper in an absolutely rotationally fixed manner, however, at least with such a resistance against an own rotation in relation to the housing of the brake caliper, which resistance is selected such that it will be always larger than the release torque of the device for creating the resistant torque, at which release torque the adjustment spindle would start rotating.

By fixing the abutment cup by means of a fixation nut on the rod according to the invention, a frictional resistance will be created between the abutment cup and this fixation nut, which resistance in turn results from the pretension as previously set, i.e. the axial spring force of the coil spring, in addition tuned in coordination with the setting of the defined torque limitation for the torque clutch.

By that it will also be possible to reduce the friction in the threaded engagement between the thrust piece and the adjustment spindle as well as, if applicable, the friction existing in other frictional pairs between components of the brake actuation mechanism, by which the latter becomes running more smoothly, in particular upon brake actuation and clearance adjustment, however, by which always a return movement of the adjustment mechanism will be prevented for the subsequent release of the brake, so that it is always guaranteed that the compensation of the clearance as adjusted is maintained.

In a second embodiment according to the invention the abutment cup is designed in such a way that it is able to radially exert a radial spring force onto the adjustment spindle. The radial spring force then determines the torque resistance of the device.

According to a preferred configuration of this embodiment a leaf-shaped spring element is provided which will be placed on the abutment cup at the side facing the brake disc and which comprises two spring sections being radially opposite to each other, which spring sections are received by corresponding recesses in the circumference of the abutment cup.

The spring sections are supported against the inner surface of the hollow adjustment spindle and thereby exert a radial spring force acting radially to the outside.

The spring element itself or together with the abutment cup can be non-rotatably mounted on the rod, for example via separate fixation means or via a press fit, so that friction of the press fit on the rod will be large enough so that, in spite of the radial spring force, the spring sections can still slide along or over the inner surface of the adjustment spindle, when the latter rotates during brake actuation and clearance adjustment.

The embodiment having the additional spring element has the advantage that more freedom is provided for the design of the other components of the brake actuation mechanism with respect to the configuration and with respect to the manufacturing and assembly tolerances, respectively.

As already mentioned above, the adjustment mechanism of the brake actuation mechanism comprises a torque clutch, which is controlled by torques and which serves for the selective transmission of a rotation between components of the torque clutch, which rotation is dependent on the rotational direction.

This torque clutch is configured as a roller-ramp-mechanism, which acts between the amplification mechanism and the thrust element, wherein the rollers of the roller-ramp-mechanism are coaxially movably arranged on the rod. In other words, the rollers of the roller-ramp-mechanism are arranged concentrically around the rod on a circular path and can move and roll, respectively, on that path in ramp surfaces section by section, which ramp surfaces are placed on this circular path and which are formed in components of the roller-ramp-mechanism being arranged opposite to each other.

Furthermore, the brake actuation mechanism is designed in such a way that the adjustment mechanism is supported in axial direction in relation to the return mechanism on the one hand and in relation to the amplification mechanism on the other by means of a low-friction bearing element, respectively.

A friction force, which is created between components of the brake actuation mechanism due to the force being exerted by the coil spring of the return mechanism and which will be transferred to the adjustment spindle by means of the torque clutch, acts against the rotation of the adjustment spindle of the adjustment mechanism.

For that purpose the adjustment mechanism is virtually embedded in the brake actuation mechanism, namely in axial direction, by means of the low-friction bearing elements. These bearing elements, which are provided in the brake actuation mechanism, are arranged externally of and beside the actual transmission path for the brake actuation force and its force flow, respectively. Also, the roller-ramp-mechanism forming the torque clutch, which always acts between the amplification mechanism and the thrust element, will be preferably arranged externally to the flow path of the clamping force. Ideally, the roller-ramp-mechanism for that cooperates at least with one of the afore-mentioned low-friction bearing elements, in an indirect or direct way.

Further advantages and features of the present invention will become apparent from the examples of embodiments being illustrated by the accompanying drawings.

BRIEF DESCRIPTION OF THE DRAWINGS

FIG. 3c is an enlarged section B from FIG. 3a;

FIG. 6a is a sectional view along U-U from FIG. 5;

FIG. 6b is an enlarged section A from FIG. 5; and

FIG. 6c is an enlarged section B from FIG. 6a.

DETAILED DESCRIPTION OF THE INVENTION

In FIGS. 1, 2, 4 and 5, respectively a brake actuation mechanism is shown, which is arranged in a housing of a brake caliper of a disc brake and which serves for transmitting a clamping force onto a brake disc by means of corresponding brake pads/linings. The housing of the brake caliper, the brake pads and the brake disc are not shown herein, however, the kind of support and the kind of the positioning of brake actuation mechanisms in such a housing as well as the kind of the connection to the brake pads will become apparent from the already previously mentioned WO 2011/113554 A2, to which herewith it is expressively referred. Also, with respect to the functioning of the adjustment mechanism and in particular of the one-way clutch in the form of a sprag spring as being embodied in such an adjustment mechanism, it is herewith expressively referred to the afore-mentioned publication as well.

The brake actuation mechanisms in both shown embodiments according to the invention are designed in such a way that they allow a simple assembly in the brake caliper on the one hand and enable a perfect functioning with at the same time compact structure due to the specific arrangement of its single pieces and components, respectively, on the other.

Figure 1:
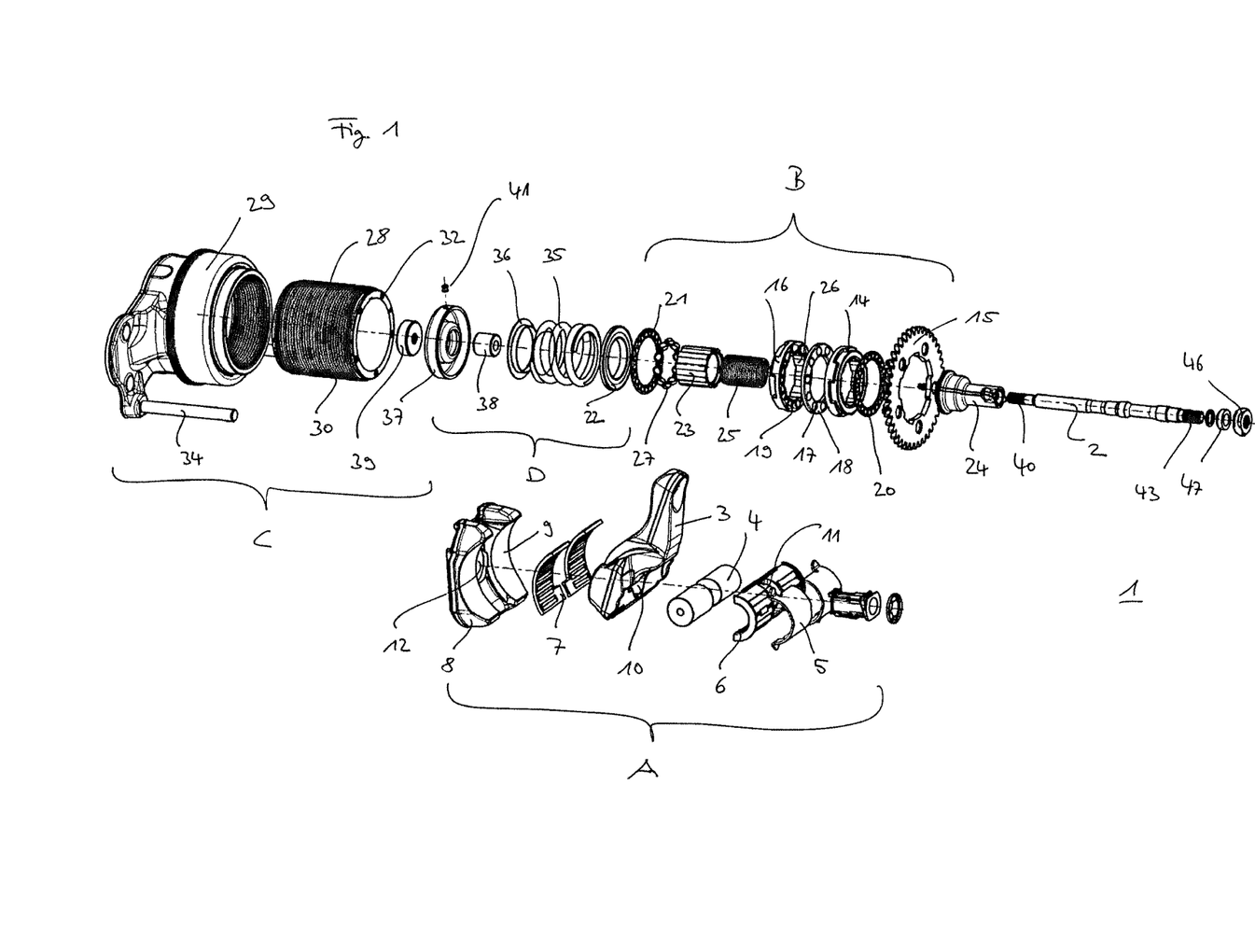
FIG. 1 is an explosive view of the substantial components of a brake actuation mechanism for a disc brake according to the present invention with respect to a first embodiment.

In an explosive view FIG. 1 shows a brake actuation mechanism 1 with its single pieces according to a first embodiment of the invention.

The brake actuation mechanism 1 substantially consists of an amplification mechanism A, which introduces an actuator force resulting from a hydraulic, pneumatic or electromechanical (or a combination thereof) actuator (not shown herein) as a clamping force into the brake actuation mechanism 1 and thereby amplifies the same according to a constructively determined transmission ratio, of an adjustment mechanism B, which serves for compensating the brake pad/lining wear, of a thrust element C, which transmits the amplified clamping force onto the brake disc, and of a return mechanism D, in order to reset the brake actuation mechanism 1 into its starting position, if no more brake force will be applied by the actuator, which is placed outside of the housing of the brake caliper.

A crucial feature of the disc brake and the brake actuation mechanism according to the invention, respectively, for that resides in the fact that the previously mentioned modules A, B, C and D are arranged on a central rod 2, which is orientated coaxially with respect to the axis of the brake disc. As it becomes apparent from the following description, the rod 2 serves as mounting means for the single modules or units of the brake actuation mechanism 1 on the one hand and as fixation means for the latter in the housing of brake caliper on the other.

The amplification mechanism A comprises a lever 3 at which, for example, a rod of a pneumatic cylinder is attached. The lever 3 is supported in a tilting manner in a rear housing section 45 of the brake caliper, in that the lever 3 is rotatably supported against two eccentric rollers 4. The cylindrical eccentric rollers 4 are rotatably received in a corresponding needle bearing cage 6 being arranged in two bearing cups 5, in which the bearing cups 5 are supported in the rear housing section 45 of the brake caliper.

Therefore, the lever 3 is designed and configured in relation to the eccentric rollers 4 in such a way that upon tilting movement around the eccentric rollers 4 an eccentric displacement of the lever 3 is set with respect to the eccentric rollers 4, which results in an amplification of the force being introduced into the lever 3 from the actuator.

Opposite to the eccentric rollers 4 the lever 3 is supported against a force transmitting element 8 by means of further needle bearing cups 7. The force transmitting element 8 is made as one piece, preferably as a cast or forged component and comprises at the side of the lever two recesses 9 in the form of almost half cups which serve to receive the needle bearing cups 7. At the side of the brake disc the force transmitting element 8 is made with flat surfaces in order to cooperate with the adjustment mechanism B and by that with the thrust element C.

For the traverse of the central rod 2 the lever 3 comprises an opening 10, the needle bearing cage 6 comprises an opening 11 and the force transmitting element 8 comprises an opening 12, whereby the bearing cups 5, the eccentric rollers 4 and the needle bearing cups 7, respectively, are arranged to both sides of the rod 2 at corresponding positions.

Directly adjacent to the amplification mechanism A in the direction towards the brake disc the adjustment mechanism B follows.

The adjustment mechanism B includes a torque clutch which is formed as roller-ramp-mechanism 13. The roller-ramp-mechanism 13 comprises a ramp body 14, which is rotationally fixedly connected with a gear wheel 15 at its side facing away from the brake disc, which gear wheel 15 serves for a connection to a manual adjustment device not shown herein.

Opposite to the ramp body 14 a bearing ring 16 is provided. The bearing ring 16 and the ramp body 14 enclose several rollers 17, which are guided in a roller cage 18 and are arranged coaxially movably around the rod 2 between the bearing ring 16 and the ramp body 14.

Each roller 17 is received in ramp surfaces 19, respectively, which are formed opposite to each other in the bearing ring 16 at one side and in the ramp body 14 at the other side. A ramp surface 19 merges with a subsequent ramp surface 19, respectively, wherein all ramp surfaces 19 are placed on a closed circular path around the rod 2. In FIG. 1 these ramp surfaces 19 can be only recognized for the bearing ring 16.

The ramp body 14 is supported against the force transmitting element 8 by at least one low-friction bearing element 20, which is provided in a cylindrical recess at the side of the force transmitting element 8 facing the brake disc.

Similar, the bearing ring 16 is supported against an intermediate ring 22 by a further low-friction bearing element 21.

The intermediate ring 22 and partly the bearing ring 16 enclose coaxially an internal holding (or receiving) sleeve 23 and partly the bearing ring 16 and the ramp body 14 with the rollers 17 in-between coaxially enclose a hollow shaft 24. At its face surfaces the internal holding sleeve 23 and the hollow shaft 24 do engage and are rotatably supported on the central rod 2.

The hollow shaft 24 and the internal holding sleeve 23 in turn coaxially enclose a sprag spring 25 acting as an one-way clutch, wherein the radial outer surface of the sprag spring 25 is in connection with the radial inner surfaces of the hollow shaft 24 and of the internal holding sleeve 23, respectively, so that these both elements can be rotationally fixedly coupled together, if needed.

The internal holding sleeve 23 is rotationally fixedly connected with the bearing ring 16 by means of an interleaving 26, wherein rollers 27 can be supported inside the interleaving, in addition, in order to form a roller guidance between the internal holding sleeve 23 and the bearing ring 16, which roller guidance comprises a very small friction in axial direction.

The hollow shaft 24, which entirely traverses the force transmitting element 8, will be set into rotation from the lever 3 by means of a mechanism. For the exact functioning it shall be referred to the corresponding disclosure of WO 2011/113554 A2.

It can be recognized from the figures that all components of the adjustment mechanism B are substantially made as rotationally symmetric pieces and are coaxially arranged around the rod 2.

The thrust element C is provided so as to enclose the adjustment mechanism B, which thrust element C is also coaxially arranged in relation to the rod 2.

The thrust element C comprises a hollow adjustment spindle 28 which externally is in an engagement with a thrust piece 29 by means of a corresponding thread 30. For reasons of a better force distribution the thrust piece 29 spreads apart trapezoidaly in direction to the brake disc and is coupled with a pad holder of the inner brake pad (not shown herein) by means of corresponding connecting elements, for example a pin/groove-connection.

At its face surface facing away from the brake disc the hollow adjustment spindle 28 is rotationally fixedly connected with the gear wheel 15 of the adjustment mechanism B by corresponding connecting elements, for example by means of pins 31 which form a press fit with corresponding blind holes 32 in the face surface of the adjustment spindle 28.

The gear wheel 15 in turn is rotationally fixedly connected with the ramp body 14 by means of a splined connection 33. By that a rotational movement of the ramp body 14 will be indirectly transferred onto the adjustment spindle 28.

Furthermore, the thrust piece 29 comprises at least one guiding element, for example a guiding rod 34, which is received in a corresponding opening in the brake caliper, so that it is ensured that the thrust piece 29 will be non-rotatably guided in the housing of the brake caliper and that a rotational movement of the adjustment spindle 28 will be transferred into an axial longitudinal movement of the thrust piece 29.

The adjustment spindle 28 not only encloses the adjustment mechanism B but also the return mechanism D in a coaxial way.

In axial direction towards the brake disc the return mechanism D follows the adjustment mechanism D and is also arranged coaxially with respect to the rod 2.

The return mechanism D consists of a coil spring 35 which at the side of the brake disc is supported against an abutment cup 37 by the intermediate arrangement of an intermediate ring 36.

In the area of the end of the rod 2 facing the brake disc the abutment cup 37 is axially positioned and fixed by means of a distance ring 38 on the one hand and by means of a fixation nut 39, which attaches to the distance ring 38 and which can be screwed onto a corresponding thread 40 at the brake disc side end of the rod 2, on the other, wherein the abutment cup 37, however, comprises a through opening having such a diameter and at least such a clearance, respectively, that the abutment cup 37 generally is rotatably supported on the distance ring 38.

At its opposite side the coil spring 35 is supported against the intermediate ring 22 of the adjustment mechanism B. In that way the return mechanism D can function at the same time as a mechanism for applying a torque limitation onto the adjustment mechanism B; with respect thereto it shall be referred to the disclosure of WO 2011/113554 A2.

Figure 3A:
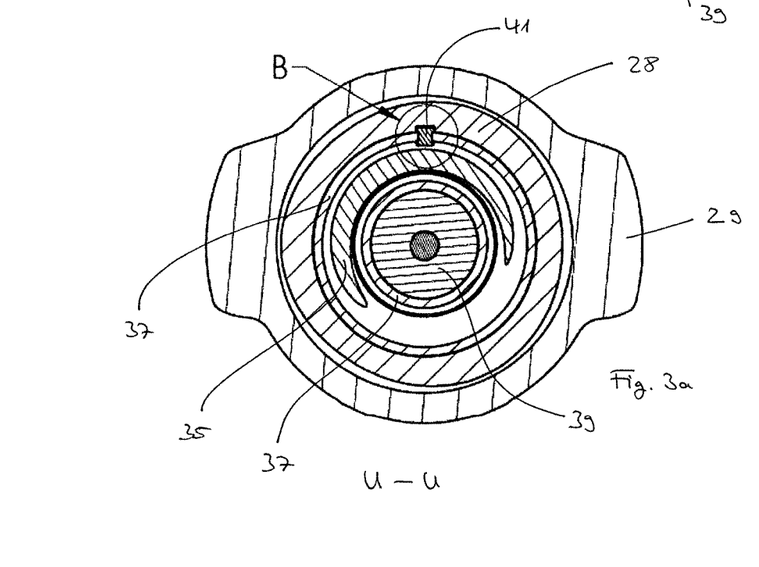
FIG. 3a is a sectional view along U-U from FIG. 2.
Figure 3B:
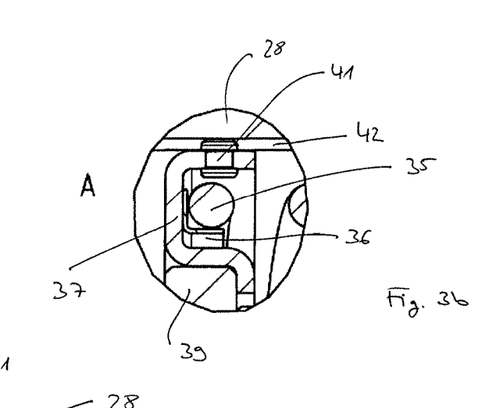
FIG. 3b is an enlarged section A from FIG. 2.
Figure 3C:
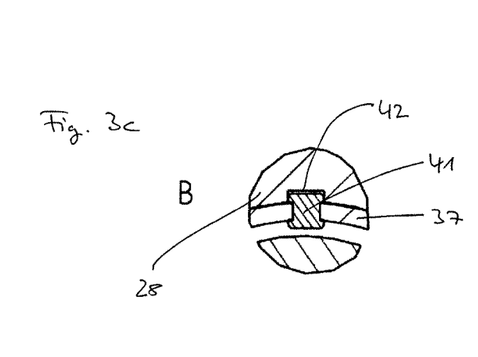

The abutment cup 37 comprises a rivet-like guiding and connecting element 41, respectively, which is fixedly received in a bore at a radial lateral surface of the abutment cup 37, as can be seen in FIGS. 3b and 3c.

The guiding and connection element 41, respectively, is slidably guided in a groove 42, which is provided at the inner surface of the hollow adjustment spindle 28 in axial direction.

By that the abutment cup 37 is fixed with the adjustment spindle 28 in a torque-proof way, i.e. non-rotatably, so that the abutment cup 37 can rotate together with the adjustment spindle 28, but at the same time thereby enables a relative axial displacement between these elements.

At its end opposite to the brake disc the rod 2 comprises a further thread 43. With this end the rod 2 traverses an opening 44 in the rear housing section 45 of the brake caliper. Externally, a further fixation nut 46 can be screwed onto the thread 43.

The opening 44 opens wedge-like to the outside so that a wedge-shaped fixation ring 47 can be tensioned in the opening 44 by means of the fixation nut 46 and thereby the rod 2 and with it the brake actuation mechanism 1 being supported on and being held together by the rod 2 can be fixed in the housing of the brake caliper.

Figure 2:
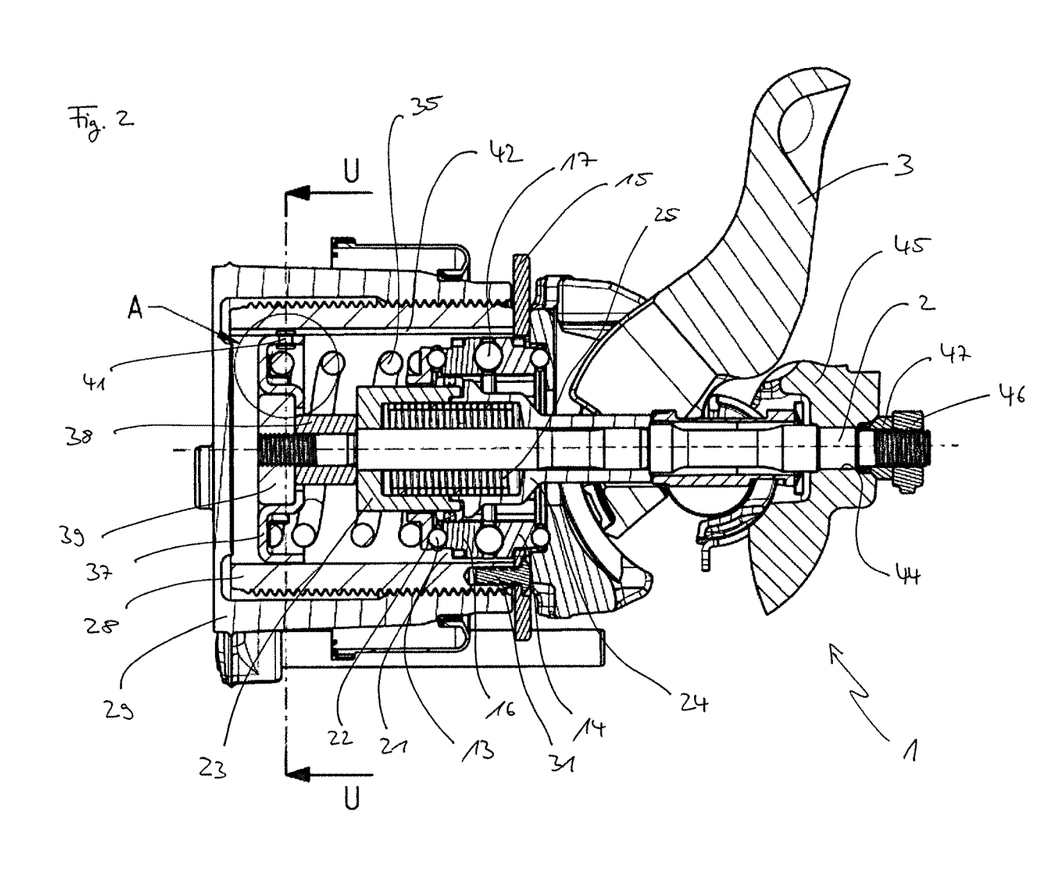
FIG. 2 is a cross sectional view through the brake actuation mechanism according to the first embodiment.

As can be seen in FIGS. 1 and 2, the rod 2 comprises a corresponding contour with different diameters and groove arrangements in order to provide the supporting surfaces and mounting means for the axial positioning of the above-mentioned single modules A, B, C and D. For that the rod 2 on the one hand and the single components of the amplification mechanism A, of the adjustment mechanism B and of the return mechanism D being supported on the rod 2 on the other are dimensioned and configured in axial direction in such a way that in the mounted, tensioned state of the rod 2 in the rear part of the brake caliper, the coil spring 35 exerts a defined torque limitation via a then formed permanent pretension on the torque clutch, which exists in the adjustment mechanism B in the form of a roller-ramp mechanism 13.

In that the abutment cup 37 for the coil spring 35 is supported against the fixation nut 39, wherein the coil spring 35 exerts a defined axial spring force due to its previously set spring characteristics, according to the invention a defined friction resistance will be created between the fixation nut 39 and the abutment cup 37, which friction resistance then will be transmitted and act onto, respectively, the hollow spindle 28 by means of the connecting element 41, so that a rotation of the hollow spindle 28 can be entirely prevented upon release of the brake.

In the FIGS. 4 to 6c a brake actuation mechanism 48 in a second embodiment according to the invention is shown.

Figure 4:
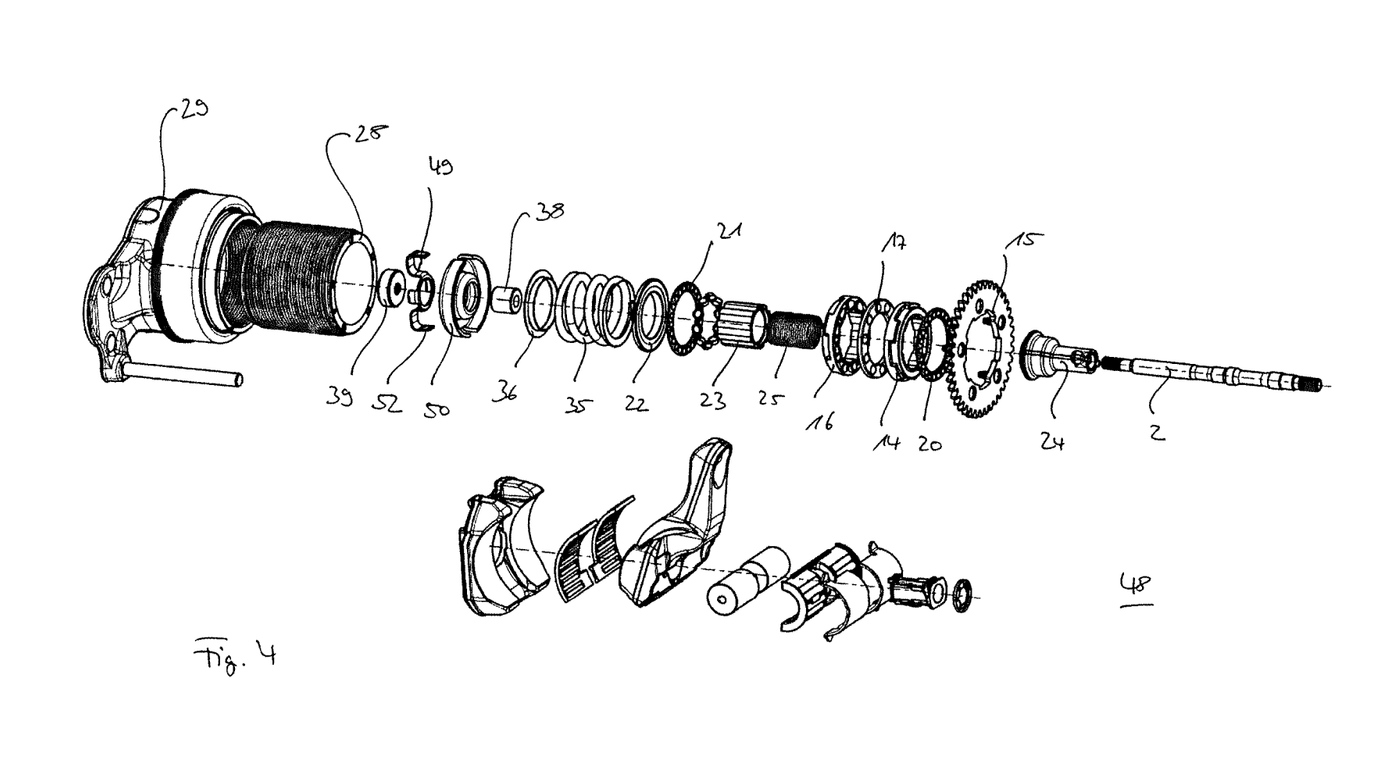
FIG. 4 is an explosive view of the substantial components of a brake actuation mechanism for a disc brake according to the present invention with respect to a second embodiment.
Figure 5:
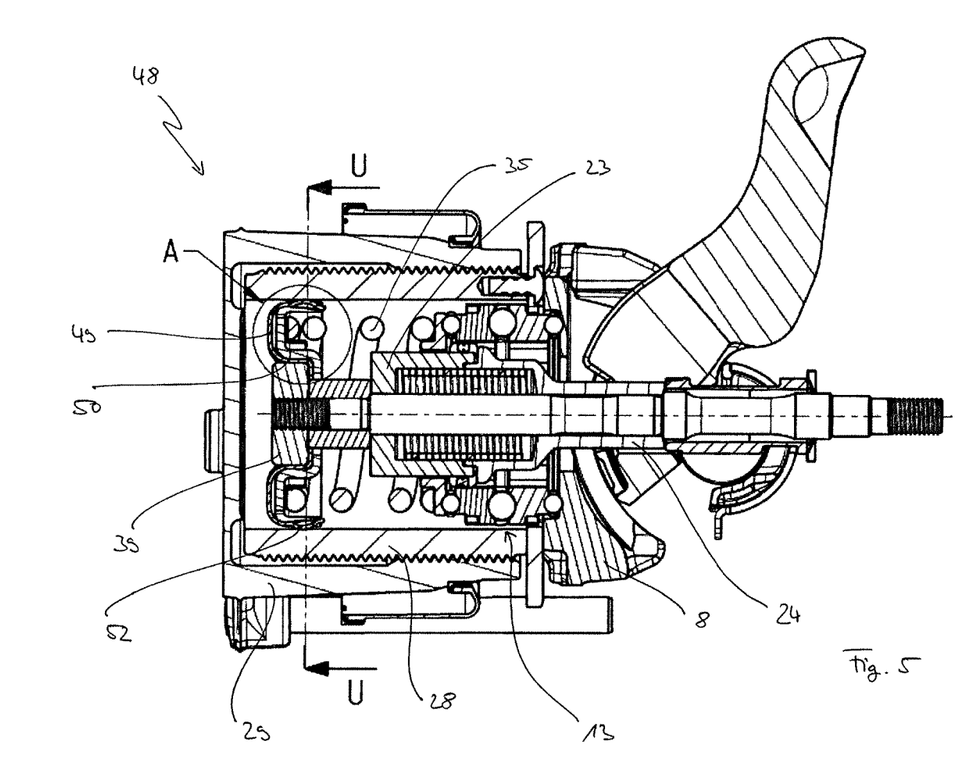
FIG. 5 is a cross sectional view through the brake actuation mechanism according to the second embodiment.

The structure of this brake actuation mechanism 48 comprises a configuration of the amplification mechanism A, of the adjustment mechanism B, of the thrust element C and of the return mechanism D, which is identical to the first embodiment. Same reference numerals are used for the same elements.

This brake actuation mechanism 48, however, differs with respect to the configuration of the device for creating a resistant torque for the threaded engagement between the adjustment spindle 28 and the thrust piece 29 according to the invention.

At the side of the brake disc a leaf-like spring element 49 is provided which attaches to an abutment cup 50, when seen from the outside of the brake disc.

As with the embodiment as described, above the abutment cup 50 will be axially positioned on the rod 2 by means of the distance ring 38 and the fixation nut 39.

The abutment cup 50 comprises two recesses 51 being radially arranged opposite to each other, into which two radial leaf-shaped spring sections 52 of the spring element 49 are inserted with play.

Figures 6A, 6B, 6C:
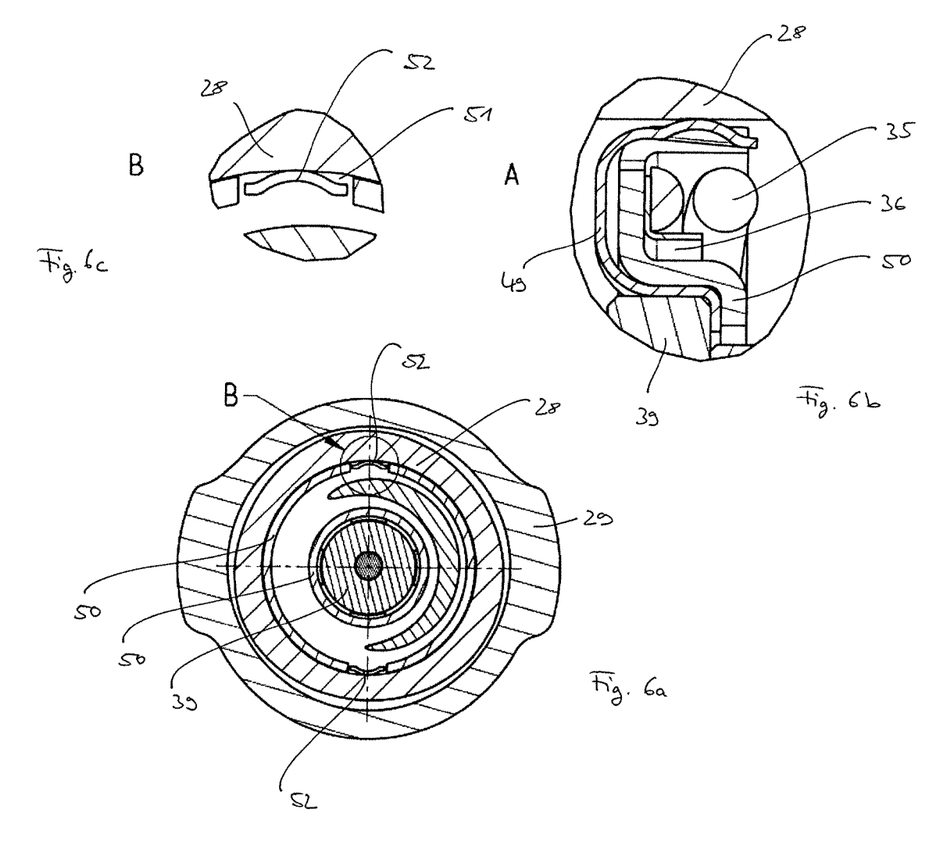

The spring element 49 and its spring sections 52, respectively, are designed in such a way that the spring sections 52 do attach to the inner side of the hollow adjustment spindle 28 in such a way that they exert a defined radial spring force.

The radial spring force thereby is dimensioned such that the adjustment spindle 28 will be held non-rotatably in its angular position upon release of the brake, i.e. when no more brake force will be transmitted by the brake actuation mechanism 48. Thereby, the previously set or adjusted clearance will be maintained. However, during an adjustment upon brake actuation the inner surface of the rotating adjustment spindle 28 can slide over the spring sections 52 without an increased resistance despite the radial spring force applied by them.

REFERENCE NUMERALS

1 Brake actuation mechanism
A Amplification mechanism
B Adjustment mechanism
C Thrust element
D Return mechanism
2 Rod
3 Lever
4 Eccentric rollers
5 Bearing cups
6 Needle bearing cage
7 Needle bearing cups
8 Force transmitting element
9 Recesses
10 Opening
11 Opening
12 Opening
13 Roller-ramp-mechanism
14 Ramp body
15 Gear wheel
16 Bearing ring
17 Roller
18 Roller cage
19 Ramp surfaces
20 Low-friction bearing element
21 Low-friction bearing element
22 Intermediate ring
23 Internal holding sleeve
24 Hollow shaft
25 Sprag spring
26 Interleaving
27 Roller
28 Hollow adjustment spindle
29 Thrust piece
30 Thread
31 Connecting elements
32 Blind bores
33 Splined connection
34 Guiding rod
35 Coil spring
36 Intermediate ring
37 Abutment cup
38 Distance ring
39 Fixation nut
40 Thread
41 Guiding/connecting element
42 Groove
43 Thread
44 Opening
45 Housing section
46 Fixation nut
47 Wedge-shaped fixation ring
48 Brake actuation mechanism
49 Spring element
50 Abutment cup
51 Radial recess
52 Spring sections

The invention claimed is:

1. A disc brake comprising a brake caliper, which overlaps at least one brake disc, and a brake actuation mechanism having
an amplification mechanism for introducing a clamping force;
an adjustment mechanism for compensating a lining wear having a torque clutch;
a thrust element for transmitting the clamping force onto the brake disc, wherein the thrust element comprises an adjustment spindle, which is in threaded engagement with a thrust piece, which cooperates with a brake pad, wherein the thrust piece is axially and non-rotatably guided in the housing of the brake caliper, so that a rotation of the adjustment spindle results in an axial displacement of the thrust piece; and
a return mechanism;
wherein the amplification mechanism, the adjustment mechanism, the thrust element and the return mechanism are mounted in a functional interacting manner in the brake caliper by means of a rod being non-movably in axial direction and non-rotatably supported in the housing of the brake caliper,
characterized by
at least one device which is configured to exert a defined resistant torque against a rotation of the adjustment spindle during brake release.

2. The disc brake according to claim 1, in which the device is configured to increase the friction in the threaded engagement between the adjustment spindle and the thrust piece.

3. The disc brake according to claim 1, in which the adjustment spindle is configured as a hollow spindle and the device is arranged inside the adjustment spindle.

4. The disc brake according to claim 1, in which the device is set under a defined pretension.

5. The disc brake according to claim 1, in which the device comprises an abutment cup, against which a coil spring of the return mechanism is supported.

6. The disc brake according to claim 5, in which the abutment cup is arranged on the rod in a rotatably supported manner and non-rotatably connected with the adjustment spindle by means of at least one connecting element.

7. The disc brake according to claim 6, in which the axial position of the abutment cup on the rod and thereby the axial spring force of the coil spring is adjustable by means, wherein the axial spring force of the coil spring determines the resistant torque of the device.

8. The disc brake according to claim 5, in which the abutment cup is configured to exert a radial spring force radially on the adjustment spindle, which radial spring force determines the resistant torque of the device.

9. The disc brake according to claim 5, in which at least one spring element is provided, which is radially received by a recess in the circumference of the abutment cup.

10. The disc brake according to claim 1, in which the torque clutch is formed as a roller-ramp-mechanism, which acts between the amplification mechanism and the thrust element, wherein the rollers of the roller-ramp-mechanism are movably arranged coaxially in relation to the rod.

11. The disc brake according to claim 10, in which the coil spring of the return mechanism exerts a spring force in axial direction on the torque clutch thereby forming a defined torque limitation.

12. The disc brake according to claim 10, in which the adjustment mechanism is supported in axial direction against the return mechanism on the one side and against the amplification mechanism on the other side by means of a low-friction bearing element, respectively.

13. The disc brake according to claim 10, in which the roller-ram p-mechanism is arranged externally of the path of the force flow of the clamping force.

14. The disc brake according to claim 10, in which the roller-ramp-mechanism is arranged inside the hollow spindle.

15. A brake actuation mechanism for a disc brake comprising
an amplification mechanism for introducing a clamping force;
an adjustment mechanism for compensating a lining wear having a torque clutch;
a thrust element for transmitting the clamping force onto a brake disc, wherein the thrust element comprises an adjustment spindle, which is in threaded engagement with a thrust piece, which cooperates with a brake pad, wherein the thrust piece is axially and non-rotatably guided in a housing of a brake caliper, so that a rotation of the adjustment spindle results in an axial displacement of the thrust piece; and
a return mechanism;
wherein the amplification mechanism, the adjustment mechanism, the thrust element and the return mechanism are mounted in a functional interacting manner in the brake caliper by means of a rod being non-movably in axial direction and non-rotatably supported in the housing of the brake caliper,
characterized by
at least one device which is configured to exert a defined resistant torque against a rotation of the adjustment spindle during brake release.

16. The brake actuation mechanism according to claim 15, in which the device is configured to increase the friction in the threaded engagement between the adjustment spindle and the thrust piece.

17. The brake actuation mechanism according to claim 15, in which the adjustment spindle is configured as a hollow spindle and the device is arranged inside the adjustment spindle.

18. The brake actuation mechanism according to claim 15, in which the device is set under a defined pretension.

19. The brake actuation mechanism according to claim 15, in which the device comprises an abutment cup, against which a coil spring of the return mechanism is supported.

20. The brake actuation mechanism according to claim 19, in which the abutment cup is arranged on the rod in a rotatably supported manner and non-rotatably connected with the adjustment spindle by means of at least one connecting element.

21. The brake actuation mechanism according to claim 20, in which the axial position of the abutment cup on the rod and thereby the axial spring force of the coil spring is adjustable by means, wherein the axial spring force of the coil spring determines the resistant torque of the device.

22. The brake actuation mechanism according to claim 19, in which the abutment cup is configured to radially exert a radial spring force on the adjustment spindle, which radial spring force determines the resistant torque of the device.

23. The brake actuation mechanism according to claim 19, in which at least one spring element is provided which is radially received by a recess in the circumference of the abutment cup.

* * * * *